US011972898B2

(12) United States Patent
Maeda et al.

(10) Patent No.: US 11,972,898 B2
(45) Date of Patent: Apr. 30, 2024

(54) SUPERCONDUCTING MAGNET

(71) Applicants: RIKEN, Wako (JP); Sumitomo Electric Industries, Ltd., Osaka (JP)

(72) Inventors: Hideaki Maeda, Wako (JP); Yoshinori Yanagisawa, Wako (JP); Kotaro Ohki, Osaka (JP); Tatsuoki Nagaishi, Osaka (JP)

(73) Assignees: RIKEN, Wako (JP); Sumitomo Electric Industries, Ltd., Osaka (JP)

( * ) Notice: Subject to any disclaimer, the term of this patent is extended or adjusted under 35 U.S.C. 154(b) by 1131 days.

(21) Appl. No.: 16/609,846

(22) PCT Filed: Mar. 9, 2018

(86) PCT No.: PCT/JP2018/009305
§ 371 (c)(1),
(2) Date: Oct. 31, 2019

(87) PCT Pub. No.: WO2018/211797
PCT Pub. Date: Nov. 22, 2018

(65) Prior Publication Data

US 2020/0075207 A1 Mar. 5, 2020

(30) Foreign Application Priority Data

May 15, 2017 (JP) ................................ 2017-096718

(51) Int. Cl.
*H01F 6/06* (2006.01)
*H01F 6/04* (2006.01)

(52) U.S. Cl.
CPC ................. *H01F 6/06* (2013.01); *H01F 6/04* (2013.01)

(58) Field of Classification Search
CPC .................................... H01F 6/06; H01F 6/04
See application file for complete search history.

(56) References Cited

U.S. PATENT DOCUMENTS 5,452,272 A * 9/1995 Murakami ........ G11B 11/10586 428/822.3
5,604,473 A * 2/1997 Rodenbush ............... H01F 6/06 505/879

(Continued)

FOREIGN PATENT DOCUMENTS

| | | | |
|---|---|---|---|
| JP | 2016-535431 A | 11/2016 | |
| WO | WO 2015/118732 * | 10/2014 | ............ H01B 12/02 |
| WO | WO-2016/129469 A1 | 8/2016 | |

OTHER PUBLICATIONS

Ito, Satoshi, "Research and Development of Superconducting Magnet System for 920 MHz-NMR," Doctoral Thesis; Yokohama National University, Mar. 2007, including partial English translation.

(Continued)

*Primary Examiner* — Paul A Wartalowicz
(74) *Attorney, Agent, or Firm* — Faegre Drinker Biddle & Reath LLP

(57) ABSTRACT

A superconducting magnet according to one embodiment includes: a coil including a superconducting layer having a first portion and a second portion, and a joining portion; and a cryostat in which the coil is stored. The first portion and the second portion are located in a termination portion. The superconducting layer forms a closed loop by superconducting joining of the first portion and the second portion at the joining portion. The superconducting layer is made of a high-temperature superconductor. A current flows through the joining portion in a superconducting state when a magnetic field equal to or greater than 1.0 tesla and equal to or less than 5.0 tesla is applied to the joining portion at 77 kelvin. The cryostat is configured such that a temperature inside the cryostat is equal to or greater than 2.0 kelvin and equal to or less than 77 kelvin.

8 Claims, 6 Drawing Sheets

(56) References Cited

U.S. PATENT DOCUMENTS

| | | | | |
|---|---|---|---|---|
| 6,358,888 | B1 * | 3/2002 | Eckels | H01F 6/065 174/125.1 |
| 2016/0216347 | A1 | 7/2016 | Roth et al. | |
| 2017/0011823 | A1 * | 1/2017 | Jin | H01F 6/06 |
| 2017/0186535 | A1 * | 6/2017 | Hahn | G01R 33/3802 |
| 2018/0025812 | A1 | 1/2018 | Ohki et al. | |

OTHER PUBLICATIONS

Kim, S. B. et al., "Shape Optimization of the Stacked HTS Double Pancake Coils for Compact NMR Relaxometry Operated in Persistent Current Mode," IEEE Transactions on Applied Superconductivity, 2016, vol. 26, No. 4, 4 pages.

* cited by examiner

SUPERCONDUCTING MAGNET

TECHNICAL FIELD

The present disclosure relates to a superconducting magnet. The present application claims a priority based on Japanese Patent Application No. 2017-096718 filed on May 15, 2017, the entire content of which is incorporated herein by reference.

BACKGROUND ART

Conventionally, a superconducting magnet disclosed in Japanese National Patent Publication No. 2016-535431 (PTL 1) has been known. The superconducting magnet disclosed in PTL 1 includes a solenoid coil. The solenoid coil includes a superconducting wire containing a high-temperature superconductor. The solenoid coil has a termination portion provided with a joint. At the joint, the superconducting wire is joined with solder.

Also conventionally, a superconducting magnet has been known, which is disclosed in "Research and Development of Superconducting Magnet System for 920 MHz-NMR" by Satoshi Ito (doctoral thesis; Yokohama National University; March in 2007) (NPL 1). The superconducting magnet disclosed in NPL 1 includes a solenoid coil. The solenoid coil includes a superconducting wire containing a low-temperature superconductor. The solenoid coil has a termination portion provided with a joint. At the joint, the superconducting wire is joined with solder.

In addition, techniques regarding superconducting-joining of a superconducting wire containing a high-temperature superconductor have been known, which are disclosed in WO2016/129469 (PTL 2) and also disclosed in "Shape Optimization of the Stacked HTS Double Pancake Coils for Compact NMR Relaxometry Operated in Persistent Current Mode, IEEE TRANSACTIONS ON APPLIED SUPERCONDUCTIVITY, Vol. 26, No. 4, June in 2016 by S. B. Kim et al. (NPL 2).

CITATION LIST

Patent Literature

PTL 1: Japanese National Patent Publication No. 2016-535431

PTL 2: WO2016/129469

Non Patent Literature

NPL 1: Research and Development of Superconducting Magnet System for 920 MHz-NMR by Satoshi Ito; doctoral thesis; Yokohama National University; March in 2007

NPL 2: Shape Optimization of the Stacked HTS Double Pancake Coils for Compact NMR Relaxometry Operated in Persistent Current Mode, IEEE TRANSACTIONS ON APPLIED SUPERCONDUCTIVITY, Vol. 26, No. 4, June in 2016 by S. B. Kim et al.

SUMMARY OF INVENTION

A superconducting magnet according to one embodiment of the present disclosure includes: a coil including a superconducting layer having a first portion and a second portion, and a joining portion; and a cryostat in which the coil is stored. The first portion and the second portion are located in a termination portion. The superconducting layer forms a closed loop by superconducting-joining of the first portion and the second portion at the joining portion. The superconducting layer is made of a high-temperature superconductor. A current flows through the joining portion in a superconducting state when a magnetic field equal to or greater than 1.0 tesla and equal to or less than 5.0 tesla is applied to the joining portion at 77 kelvin. The cryostat is configured such that a temperature inside the cryostat is equal to or greater than 2.0 kelvin and equal to or less than 77 kelvin.

DETAILED DESCRIPTION

Figure 1:
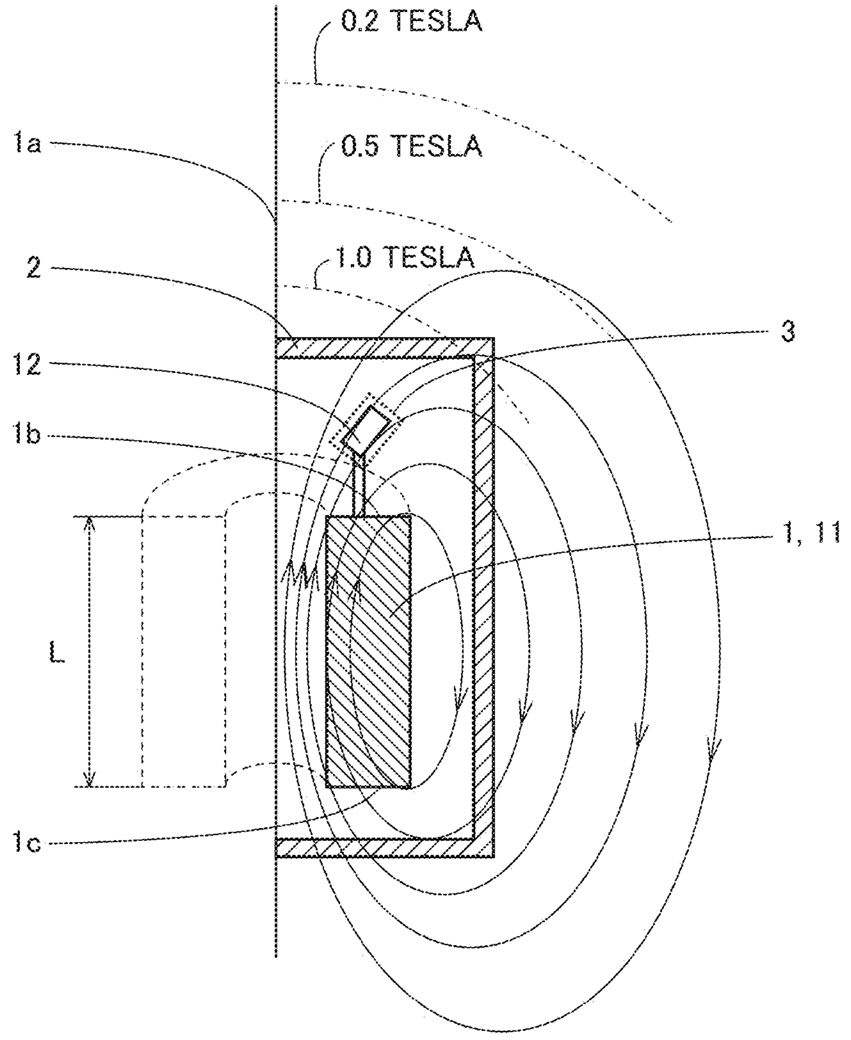
FIG. 1 is a schematic cross-sectional view of a superconducting magnet according to the first embodiment.

Problem to be Solved by the Present Disclosure

In a superconducting magnet disclosed in PTL 1, a superconducting wire is joined at a joint with solder. With solder, a high-temperature superconductor cannot be superconducting-joined. Thus, the superconducting magnet disclosed in PTL 1 cannot be operated in a permanent current mode (in an operation mode in which a current continuously flows through a coil without supplying a current from an external power supply).

A low-temperature superconductor can be superconducting joined with solder. However, the critical magnetic field strength (the maximum value of the magnetic field strength at which the superconducting state can be maintained) of solder is relatively low (less than 0.2 tesla at 4.2 kelvin). Accordingly, when a superconducting magnet is operated in a permanent current mode, the distance between the joint and the solenoid coil needs to be increased for the purpose of decreasing the magnetic field strength at the position where the joint is provided. As a result, a cryostat accommodating a coil is increased in size, so that a superconducting magnet is increased in size. For example, in a superconducting magnet disclosed in NPL 1, a joint is disposed at a position where the strength of a magnetic field generated by a current flowing through a coil is less than 1.0 tesla in the state where a magnetic shield is provided. In addition, it is difficult to achieve high magnetic field strength with a coil formed of a superconducting wire containing a low-temperature superconductor.

The present disclosure has been made in view of the above-described problems of the conventional art. More specifically, the present disclosure provides a superconducting magnet that can be operated in a permanent current mode and that can be reduced in size.

Advantageous Effect of the Present Disclosure

In a superconducting magnet according to one embodiment of the present disclosure, even when a joining portion is disposed at a position where the strength of the magnetic field generated by the current flowing through a coil is equal to or greater than 1.0 tesla and equal to or less than 5.0 tesla, a current flows through the joining portion in the superconducting state. Accordingly, the superconducting magnet can be operated in a permanent current mode. When the joining portion can be disposed at a position closer to a coil, a cryostat can be reduced in size. Thus, the superconducting magnet according to one embodiment of the present disclosure can be operated in a permanent current mode and also can be reduced in size.

Description of Embodiments

The embodiments of the present disclosure will be first listed below for explanation.

(1) A superconducting magnet according to one embodiment of the present disclosure includes: a coil including a superconducting layer having a first portion and a second portion, and a joining portion; and a cryostat in which the coil is stored. The first portion and the second portion are located in a termination portion of the coil. The superconducting layer forms a closed loop by superconducting joining of the first portion and the second portion at the joining portion. The superconducting layer is made of a high-temperature superconductor. A current flows through the joining portion in a superconducting state when a magnetic field equal to or greater than 1.0 tesla and equal to or less than 5.0 tesla is applied to the joining portion at 77 kelvin. The cryostat is configured such that a temperature inside the cryostat is equal to or greater than 2.0 kelvin and equal to or less than 77 kelvin. The superconducting magnet according to (1) can be operated in a permanent current mode and can be reduced in size.

(2) In the superconducting magnet according to (1), the joining portion may be disposed at a position where a strength of a magnetic field generated by a current flowing through the coil is equal to or greater than 1.0 tesla and equal to or less than 5.0 tesla. The superconducting magnet according to (2) can be operated in a permanent current mode and can be reduced in size.

(3) The superconducting magnet according to (1) may further include a magnetic shield that is disposed inside the cryostat so as to cover the joining portion, the magnetic shield being configured to decrease a strength of a magnetic field generated by a current flowing through the coil. The joining portion may be disposed at a position where the strength of the magnetic field generated by the current flowing through the coil is equal to or greater than 1.0 tesla and equal to or less than 10 tesla. The superconducting magnet according to (3) can be operated in a permanent current mode and can be reduced in size.

(4) In the superconducting magnet according to (1), a current flows through the joining portion in the superconducting state when a magnetic field equal to or greater than 1.0 tesla and equal to or less than 10 tesla is applied to the joining portion at 4.2 kelvin. The cryostat may be configured such that the temperature inside the cryostat is equal to or greater than 2.0 kelvin and equal to or less than 4.2 kelvin. The joining portion may be disposed at a position where a strength of a magnetic field generated by a current flowing through the coil is equal to or greater than 1.0 tesla and equal to or less than 10 tesla.

In the superconducting magnet according to (4), even when the joining portion is disposed at a position where the strength of the magnetic field generated by the current flowing through the coil is equal to or greater than 1.0 tesla and equal to or less than 10 tesla, the superconducting magnet can be operated in a permanent current mode. Thus, the superconducting magnet according to (4) can be further reduced in size. Furthermore, in the superconducting magnet according to (4), the value of the critical current in the joining portion increases largely as compared with the case where the temperature inside the cryostat is 77 kelvin. Thus, in the superconducting magnet according to (4), the amount of the current that can flow through the coil can be increased.

(5) In the superconducting magnet according to (1), a current flows through the joining portion in a superconducting state when a magnetic field equal to or greater than 1.0 tesla and equal to or less than 10 tesla is applied to the joining portion at 50 kelvin. The cryostat may be configured such that the temperature inside the cryostat is greater than 4.2 kelvin and equal to or less than 50 kelvin. The joining portion may be disposed at a position where a strength of a magnetic field generated by a current flowing through the coil is equal to or greater than 1.0 tesla and equal to or less than 10 tesla.

In the superconducting magnet according to (5), even when the joining portion is disposed at a position where the strength of the magnetic field generated by the current flowing through the coil is equal to or greater than 1.0 tesla and equal to or less than 10 tesla, the superconducting magnet can be operated in a permanent current mode. Thus, the superconducting magnet according to (5) can be further reduced in size. Furthermore, in the superconducting magnet according to (5), the value of the critical current in the joining portion does not decrease largely as compared with the case where the temperature inside the cryostat is 4.2 kelvin, but increases largely as compared with the case where the temperature inside the cryostat is 77 kelvin. Thus, the superconducting magnet according to (5) allows a high current to flow through a coil at a relatively high temperature.

(6) In the superconducting magnet according to (1) to (5), the coil may be a solenoid coil. The joining portion may be disposed at a position where a distance from an end of the coil in a coil length direction is equal to or greater than 0.033 times and equal to or less than 0.3 times as large as a coil length. The superconducting magnet according to (6) can be operated in a permanent current mode and can be reduced in size.

(7) In the superconducting magnet according to (3) to (5), the coil may be a double pancake coil. The joining portion may be disposed at a position where a distance from an outer circumferential surface of the coil is equal to or greater than 0.125 times and equal to or less than 0.75 times as large as a coil diameter. The superconducting magnet according to (7) can be operated in a permanent current mode and can be reduced in size.

(8) In the superconducting magnet according to (1) to (7), a joining interface between the first portion and the second portion may be disposed in parallel to a direction of a magnetic field generated by a current flowing through the coil. In the superconducting magnet according to (8), the joining portion can be disposed at a position closer to the coil, so that the superconducting magnet can be further reduced in size.

(9) In the superconducting magnet according to (1) to (8), the high-temperature superconductor may be a REBCO. The joining portion may further include a joining layer formed of a high-temperature superconductor and disposed between the first portion and the second portion. The superconducting magnet according to (9) can be reduced in size while ensuring the reliability of superconducting-joining.

(10) In the superconducting magnet according to (9), the joining layer may be disposed such that a crystal orientation of the joining layer extends along a crystal orientation of each of the first portion and the second portion. The superconducting magnet according to (10) can be reduced in size while ensuring the reliability of superconducting-joining.

The embodiments of the present disclosure will be hereinafter described in detail with reference to the accompanying drawings, in which the same or corresponding components are designated by the same reference characters. At least some of the embodiments described below may be arbitrarily combined.

First Embodiment

In the following, the configuration of a superconducting magnet according to the first embodiment will be described.

FIG. 1 is a schematic cross-sectional view of a superconducting magnet according to the first embodiment. In FIG. 1, magnetic lines of force are shown by solid line arrows. Also in FIG. 1, contour lines of magnetic field are shown by alternate long and short dash lines. As shown in FIG. 1, the superconducting magnet according to the first embodiment includes a coil 1 and a cryostat 2. Coil 1 is disposed inside cryostat 2. The inside of cryostat 2 is cooled by a cooling medium. Thereby, coil 1 and joining portion 12 that are disposed inside cryostat 2 are cooled. The cooling medium is liquid helium, liquid nitrogen, and the like, for example. The inside of cryostat 2 may be cooled through conduction by a separately attached refrigerator. In this case, coil 1 and joining portion 12 disposed inside cryostat 2 are also cooled through conduction.

Cryostat 2 is configured such that the temperature inside thereof is equal to or less than 77 kelvin (a liquid nitrogen temperature). Cryostat 2 is configured such that the temperature inside thereof is preferably greater than 4.2 kelvin and equal to or less than 50 kelvin. The temperature inside cryostat 2 is particularly preferably equal to or less than 4.2 kelvin (a liquid helium temperature). Cryostat 2 is configured such that the temperature inside thereof is equal to or greater than 2.0 kelvin.

Coil 1 is a solenoid coil, for example. In other words, coil 1 is formed by spirally winding a superconducting wire 11 around a central axis 1*a* of coil 1. The direction along central axis 1*a* will be referred to as a coil length direction of coil 1. Coil 1 has a coil length L along the coil length direction. Coil 1 has a first end 1*b* and a second end 1*c*. First end 1*b* and second end 1*c* correspond to both ends of coil 1 in the coil length direction. Second end 1*c* is located on the opposite side of first end 1*b*. Coil length L corresponds to a distance between first end 1*b* and second end 1*c*. A plurality of coils 1 may be provided. When a plurality of coils 1 are provided, coils 1 are concentrically arranged.

Figure 2:
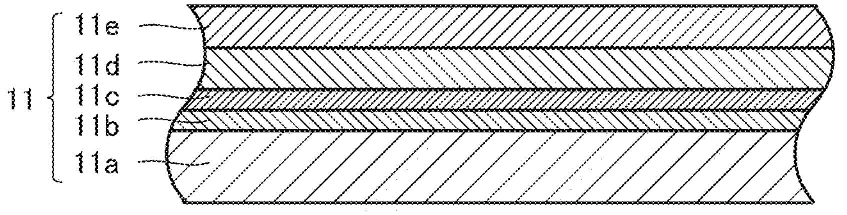
FIG. 2 is a cross-sectional view taken along a section extending in the longitudinal direction of a superconducting wire 11.

FIG. 2 is a cross-sectional view taken along a section extending in the longitudinal direction of superconducting wire 11. As shown in FIG. 2, superconducting wire 11 includes a base material 11*a*, an intermediate layer 11*b*, a superconducting layer 11*c*, a protection layer 11*d*, and a stabilization layer 11*e*. As described above, coil 1 is formed of superconducting wire 11. Thus, coil 1 includes superconducting layer 11*c*.

Base material 11*a* is formed, for example, of a cladding material obtained by stacking a layer containing stainless steel, a layer containing copper (Cu) and a layer containing nickel (Ni). It is to be noted that base material 11*a* is not limited to the above. Base material 11 a may be formed of Hastelloy (registered trademark), for example.

Intermediate layer 11*b* is disposed on base material 11*a*. Intermediate layer 11*b* serves as a layer for reducing a lattice mismatch between base material 11*a* and superconducting layer 11*c*. The material forming intermediate layer 11*b* is selected as appropriate in accordance with the material forming superconducting layer 11*c*. For example, when the material forming superconducting layer 11*c* is a REBCO that will be described later, cerium oxide ($CeO_2$) is used for intermediate layer 11*b*, for example. It is preferable that intermediate layer 11*b* has a uniform crystal orientation.

Superconducting layer 11*c* is formed of a high-temperature superconductor. The high-temperature superconductor means a material having a superconducting transition temperature that is equal to or greater than a liquid nitrogen temperature (77 kelvin). The high-temperature superconductor that forms superconducting layer 11*c* is a REBCO, for example. This REBCO is a material represented by (RE) $Ba_2Cu_3O_x$ (RE is a rare earth element such as yttrium (Y) and gadolinium (Gd), for example). It is to be noted that the material forming superconducting layer 11*c* is not limited to the above. The material forming superconducting layer 11*c* may be $Bi_2Sr_2Ca_2Cu_3O_x$ (Bi-2223), for example.

It is preferable that superconducting layer 11*c* has a uniform crystal orientation. Specifically, it is preferable that a c-axis of the material forming superconducting layer 11*c* extends in the direction from intermediate layer 11*b* to protection layer 11*d* (the thickness direction of superconducting layer 11*c*). In a different point of view, it is preferable that an a-b plane of the material forming superconducting layer 11*c* is parallel to the longitudinal direction and the width direction of superconducting wire 11.

Protection layer 11*d* is disposed on superconducting layer 11*c*. Protection layer 11*d* is formed of silver (Ag) or the like, for example. Stabilization layer 11*e* is disposed on protection layer 11*d*. Stabilization layer 11*e* is formed of Cu or the like, for example. Protection layer 11*d* and stabilization layer 11*e* each serve as a bypass for a current when quenching (a phenomenon of shifting from to a superconducting state to a normal conducting state) occurs in superconducting layer 11*c*.

As shown in FIG. 1, coil 1 includes a portion of superconducting wire 11 that is pulled out to the outside. The portion of superconducting wire 11 that is pulled out to the outside is referred to as a termination portion of coil 1. The termination portion of coil 1 is located on the first end 1*b* side, for example. In other words, superconducting wire 11 is pulled to the outside of coil 1 on the first end 1*b* side.

Coil 1 includes joining portion 12. Portions of superconducting layer 11*c* that are located at the termination portion of coil 1 will be referred to as a first portion 11*ca* and a second portion 11*cb*. Protection layer 11*d* and stabilization layer 11*e* are removed from a portion of superconducting wire 11 that is located at the termination portion. Joining portion 12 has first portion 11*ca* and second portion 11*cb*.

Figure 3:
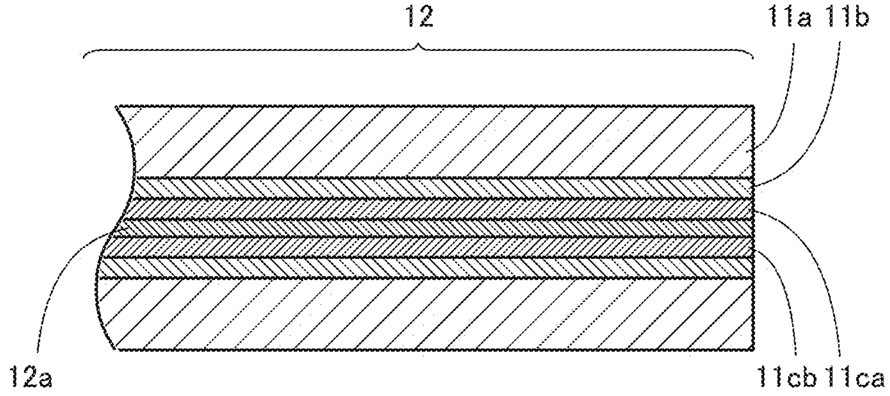
FIG. 3 is a cross-sectional view of a coil 1 in a joining portion 12.

FIG. 3 is a cross-sectional view of coil 1 in joining portion 12. As shown in FIG. 3, first portion 11*ca* and second portion 11*cb* are superconducting-joined at joining portion 12. In this case, the state where first portion 11*ca* and second portion 11*cb* are superconducting joined means the state where first portion 11*ca* and second portion 11*cb* are joined such that a current flows between first portion 11*ca* and second portion 11*cb* in the superconducting state when joining portion 12 is cooled to a temperature equal to or less than a superconducting transition temperature.

First portion 11*ca* and second portion 11*cb* are superconducting-joined at joining portion 12, so that superconducting layer 11*c* of coil 1 forms a closed loop. In other words, superconducting layer 11*c* of coil 1 is continuous along a path starting from the termination portion and returning to the termination portion.

Joining portion 12 may have a joining layer 12*a*. Joining layer 12*a* is formed of a high-temperature superconductor. Preferably, joining layer 12*a* is formed of the same material as that of the high-temperature superconductor forming superconducting layer 11*c*. It is preferable that joining layer 12*a* is disposed such that the crystal orientation of joining layer 12*a* extends along the crystal orientations of first portion 11*ca* and second portion 11*cb*. More specifically, it is preferable that joining layer 12*a* is disposed such that the c-axis of joining layer 12*a* extends along the c-axis of each of first portion 11*ca* and second portion 11*cb*.

Figure 4:
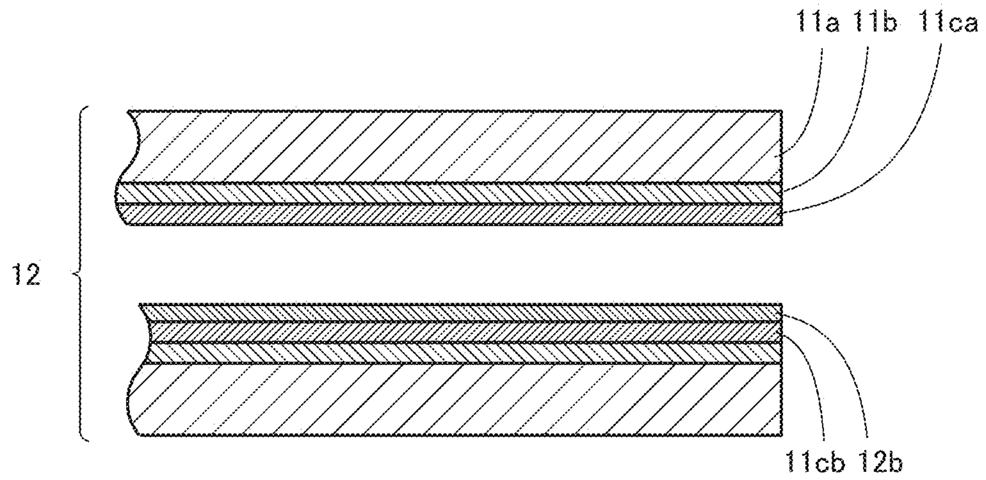
FIG. 4 is a schematic cross-sectional view of joining portion 12 in first step S1.

When joining layer 12*a* is used, first portion 11*ca* and second portion 11*cb* are superconducting joined in first step S1 and second step S2. FIG. 4 is a schematic cross-sectional view of joining portion 12 in first step S1. As shown in FIG. 4, in first step S1, a microcrystalline film 12*b* is formed on at least one of first portion 11*ca* and second portion 11*cb*. Microcrystalline film 12*b* is formed as a film containing a microcrystal of the high-temperature superconductor used for joining layer 12*a*.

For forming microcrystalline film 12*b*, an organic compound of the element forming a high-temperature superconductor used for joining layer 12*a* is first applied on at least one of first portion 11*ca* and second portion 11*cb*. Secondly, the coating film of this organic compound is heat-treated. Thereby, this coating film of the organic compound becomes a precursor of the high-temperature superconductor used for joining layer 12*a* (in the following, the film containing this precursor will be referred to as a calcined film). This precursor contains carbide of the element that forms the high-temperature superconductor used for joining layer 12*a*. In addition, this heat treatment is performed at the treatment temperature that is equal to or higher than the temperature at which this organic compound is decomposed and that is less than the temperature at which a high-temperature superconductor used in joining layer 12*a* is produced. Thirdly, the calcined film is heat-treated. Thereby, the carbide contained in the calcined film is decomposed into a high-temperature superconductor used in joining layer 12*a*, to thereby form microcrystalline film 12*b*. The calcined film is heat-treated in an atmosphere at an oxygen concentration equal to or greater than 1%.

Figure 5:
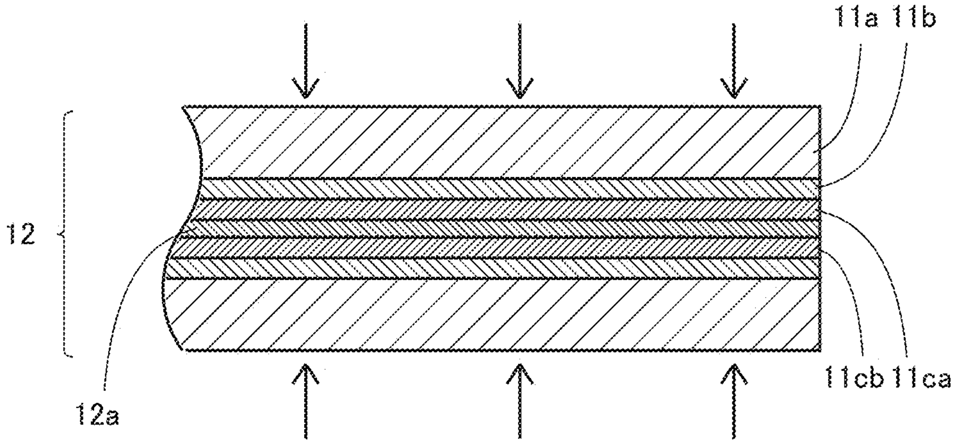
FIG. 5 is a schematic cross-sectional view of joining portion 12 in second step S2.

FIG. 5 is a schematic cross-sectional view of joining portion 12 in second step S2. In second step S2, first portion 11*ca* is disposed to face second portion 11*cb* with microcrystalline film 12*b* interposed therebetween, as shown in FIG. 5. In second step S2, pressure is applied between first portion 11*ca* and second portion 11*cb*. During this application of pressure, heat is also applied. As a result, the microcrystal in the high-temperature superconductor contained in microcrystalline film 12*b* epitaxially grows along the crystal orientations of first portion 11*ca* and second portion 11*cb*, thereby forming joining layer 12*a*. After second step S2 is performed, heat treatment is performed in an atmosphere containing oxygen, so that oxygen is introduced into joining layer 12*a*. This consequently leads to superconducting joining between first portion 11*ca* and second portion 11*cb*.

Figure 6:
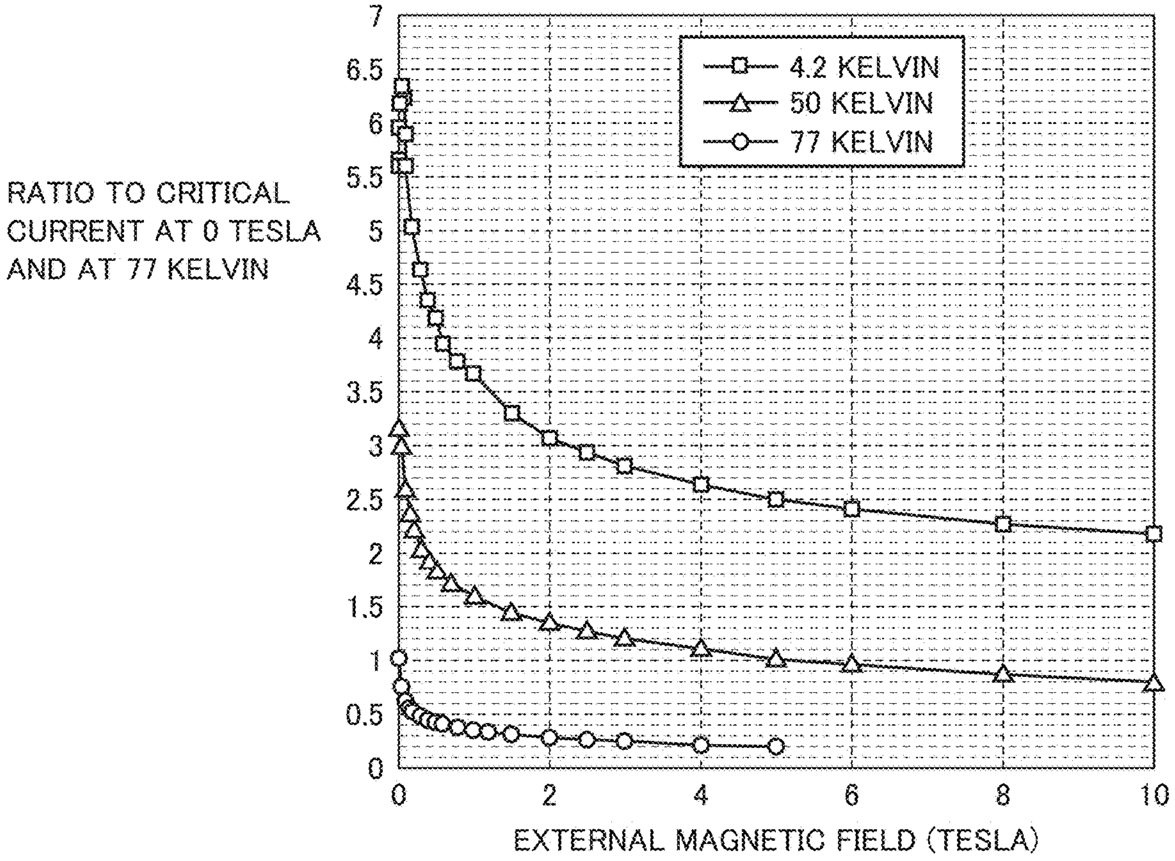
FIG. 6 is a graph showing the relation between a magnetic field applied to joining portion 12 and a critical current flowing through joining portion 12.

FIG. 6 is a graph showing the relation between a magnetic field applied to joining portion 12 and a critical current flowing through joining portion 12. In the test shown in FIG. 6, a magnetic field parallel to the joining interface between first portion 11*ca* and second portion 11*cb* is applied to joining portion 12 including joining layer 12*a*. The vertical axis in FIG. 6 represents a ratio to the critical current flowing through joining portion 12 when no magnetic field is applied at 77 kelvin. The horizontal axis in FIG. 6 represents the strength of the magnetic field (unit: tesla) applied to joining portion 12.

As shown in FIG. 6, a current flows through joining portion 12 in the superconducting state when a magnetic field of 1.0 tesla is applied to joining portion 12 at 77 kelvin. In other words, the critical magnetic field strength of joining portion 12 at 77 kelvin is equal to or greater than 1.0 tesla. A current flows through joining portion 12 in the superconducting state when a magnetic field of 5.0 tesla is applied to joining portion 12 at 77 kelvin. In other words, the critical magnetic field strength of joining portion 12 at 77 kelvin is equal to or greater than 5.0 tesla. In a different point of view, a current flows through joining portion 12 in the superconducting state when a magnetic field equal to or greater than 1.0 tesla and equal to or less than 5.0 tesla is applied to joining portion 12 at 77 kelvin.

Also, a current flows through joining portion 12 in the superconducting state when a magnetic field of 1.0 tesla is applied to joining portion 12 at 4.2 kelvin. In other words, the critical magnetic field strength of joining portion 12 at 4.2 kelvin is equal to or greater than 1.0 tesla. A current flows through joining portion 12 in the superconducting state when a magnetic field of 10 tesla is applied to joining portion 12 at 4.2 kelvin. In other words, the critical magnetic field strength of joining portion 12 at 4.2 kelvin is equal to or greater than 10 tesla. In a different point of view, a current flows through joining portion 12 in the superconducting state when a magnetic field equal to or greater than 1.0 tesla and equal to or less than 10 tesla is applied to joining portion 12 at 4.2 kelvin.

In the state where no magnetic field is applied, the critical current (the maximum value of the current that can flow in the superconducting state) that flows through joining portion 12 at 4.2 kelvin is about 6.4 times as high as the critical current that flows through joining portion 12 at 77 kelvin.

Also, a current flows through joining portion 12 in the superconducting state when a magnetic field of 1.0 tesla is applied to joining portion 12 at 50 kelvin. In other words, the critical magnetic field strength of joining portion 12 at 50 kelvin is equal to or greater than 1.0 tesla. A current flows through joining portion 12 in the superconducting state when a magnetic field of 10 tesla is applied to joining portion 12 at 50 kelvin. In other words, the critical magnetic field strength of joining portion 12 at 50 kelvin is equal to or greater than 10 tesla. In a different point of view, a current flows through joining portion 12 in the superconducting state when a magnetic field equal to or greater than 1.0 tesla and equal to or less than 10 tesla is applied to joining portion 12 at 50 kelvin.

In the state where no magnetic field is applied, the critical current flowing through joining portion 12 at 50 kelvin is about 0.5 times as high as the critical current that flows through joining portion 12 at 4.2 kelvin, and about 3.3 times as high as the critical current that flows through joining portion 12 at 77 kelvin. In the state where a magnetic field of 5.0 tesla is applied, the critical current that flows through joining portion 12 at 50 kelvin is about 0.4 times as high as the critical current that flows through joining portion 12 at 4.2 kelvin, and about 5 times as high as the critical current that flows through joining portion 12 at 77 kelvin.

Figure 7:
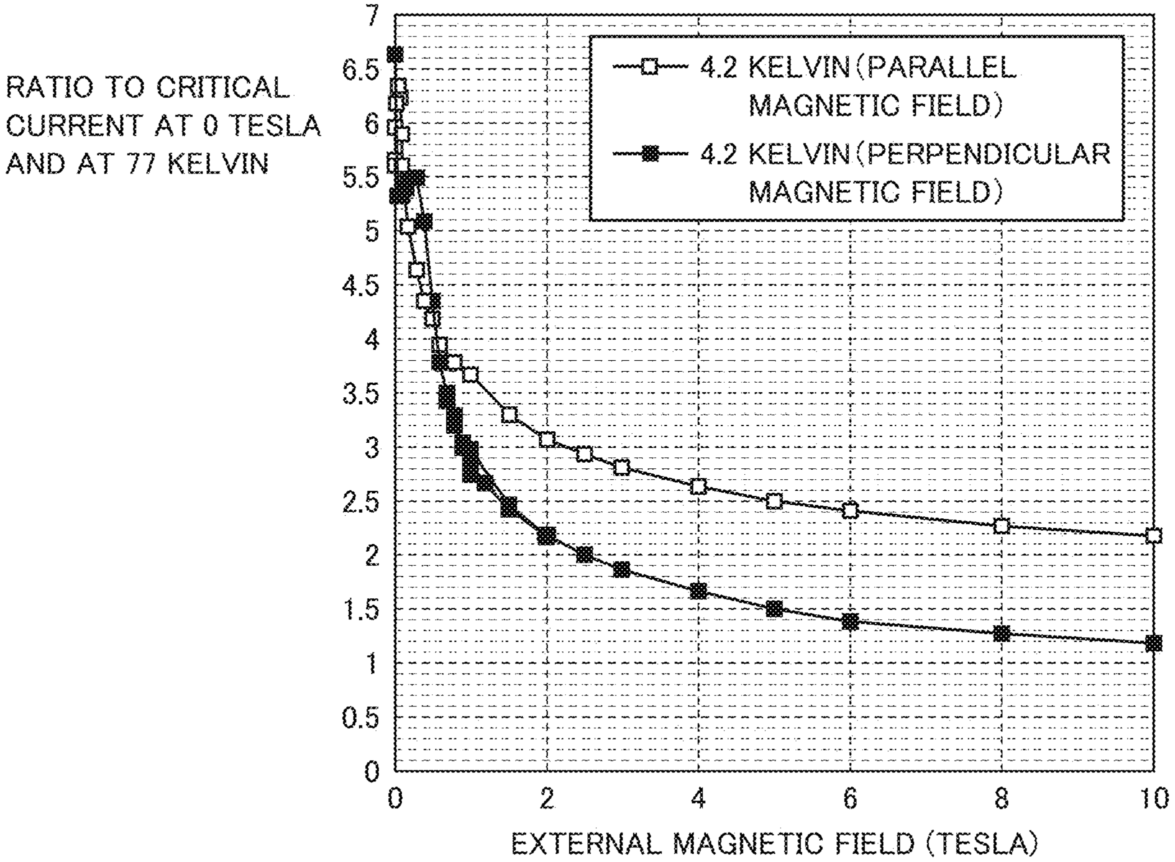
FIG. 7 is a graph showing a critical current in joining portion 12 in the case where a magnetic field parallel to a joining interface between a first portion 11*ca* and a second portion 11*cb* is applied and in the case where a magnetic field perpendicular to the joining interface between first portion 11*ca* and second portion 11*cb* is applied.

FIG. 7 is a graph showing a critical current in joining portion 12 in the case where a magnetic field parallel to the joining interface between first portion 11*ca* and second portion 11*cb* is applied and in the case where a magnetic field perpendicular to the joining interface between first portion 11*ca* and second portion 11*cb* is applied. The vertical axis in FIG. 7 represents a ratio to the critical current that flows through joining portion 12 when no magnetic field is applied at 77 kelvin. The horizontal axis in FIG. 7 represents the strength of the magnetic field (unit: tesla) applied to joining portion 12. In the test shown in FIG. 7, joining portion 12 includes joining layer 12*a*. As shown in FIG. 7, the critical current in joining portion 12 is higher when a magnetic field parallel to the joining interface between first portion 11*ca* and second portion 11*cb* is applied than when a magnetic field perpendicular to the joining interface between first portion 11*ca* and second portion 11*cb* is applied. In a different point of view, the critical magnetic field strength of joining portion 12 is higher when a magnetic field parallel to the joining interface between first portion 11*ca* and second portion 11*cb* is applied than when a magnetic field perpendicular to the joining interface between first portion 11*ca* and second portion 11*cb* is applied.

As shown in FIG. 1, joining portion 12 is preferably disposed at a position where the critical magnetic field strength of joining portion 12 at the temperature inside cryostat 2 is greater than the strength of the magnetic field generated by the current flowing through coil 1. More specifically, joining portion 12 is disposed at a position where the strength of the magnetic field generated by the current flowing through coil 1 is equal to or greater than 1.0 tesla and equal to or less than 5.0 tesla. Joining portion 12 is further more preferably disposed at a position where the strength of the magnetic field generated by the current flowing through coil 1 is equal to or greater than 1.0 tesla and equal to or less than 10 tesla.

Joining portion 12 is preferably disposed such that the joining interface between first portion 11*ca* and second portion 11*cb* extends in parallel to the direction of the magnetic field generated by the current flowing through coil 1. The state where the joining interface between first portion 11*ca* and second portion 11*cb* extends in parallel to the direction of the magnetic field generated by the current flowing through coil 1 means the state where the joining interface between first portion 11*ca* and second portion 11*cb* forms an angle in the range of ±5° with the direction of the magnetic field generated by the current flowing through coil 1.

More specifically, joining portion 12 is disposed inside coil 1 in a plan view (in a view seen from the direction parallel to central axis 1*a*). Preferably, joining portion 12 is disposed at the position where the distance from first end 1*b* is equal to or greater than 0.033 times and equal to or less than 0.3 times as large as coil length L. Further preferably, joining portion 12 is disposed at the position where the distance from first end 1*b* is equal to or greater than 0.033 times and equal to or less than 0.17 times as large as coil length L. In addition, when the center strength of the magnetic field generated by the current flowing through coil 1 is 21.6 tesla, the strength of the magnetic field generated by the current flowing through coil 1 is equal to or greater than 1.0 tesla and equal to or less than 10 tesla at the position inside coil 1 in a plan view and where the distance from first end 1*b* is equal to or greater than 0.033 times and equal to or less than 0.3 times as large as coil length L.

As shown in FIG. 1, the superconducting magnet according to the first embodiment may further include a magnetic shield 3. Magnetic shield 3 is disposed inside cryostat 2 so as to cover joining portion 12. As described above, a magnetic field generated by the current flowing through coil 1 is applied to joining portion 12. Magnetic shield 3 serves to reduce this magnetic field. A coil formed of a superconducting wire, for example, is used for magnetic shield 3. When magnetic shield 3 is provided, joining portion 12 may be disposed at the position where the magnetic field generated by the current flowing through coil 1 is greater than the critical magnetic field strength of joining portion 12 inside cryostat 2.

In the following, the effect of the superconducting magnet according to the first embodiment will be described.

As described above, a current flows through joining portion 12 in the superconducting state when a magnetic field equal to or greater than 1.0 tesla and equal to or less than 5.0 tesla is applied to joining portion 12 at 77 kelvin. Furthermore, in the superconducting magnet according to the first embodiment, the temperature inside cryostat 2 is equal to or less than 77 kelvin. Thus, in the superconducting magnet according to the first embodiment, joining portion 12 can be disposed at the position where the strength of the magnetic field generated by the current flowing through coil 1 is equal to or greater than 1.0 tesla and equal to or less than 5.0 tesla. As joining portion 12 is disposed at the position closer to coil 1, cryostat 2 can be further reduced in size. In this way, the superconducting magnet according to the first embodiment can be operated in a permanent current mode and also can be reduced in size.

In the superconducting magnet according to the first embodiment, in the case where the temperature inside cryostat 2 is equal to or greater than 2.0 kelvin and equal to or less than 4.2 kelvin and a current flows through joining portion 12 in the superconducting state when a magnetic field equal to or greater than 1.0 tesla and equal to or less than 10 tesla is applied at 4.2 kelvin, joining portion 12 can be disposed at the position where the strength of the magnetic field generated by the current flowing through coil 1 is equal to or greater than 1.0 tesla and equal to or less than 10 tesla. Accordingly, in this case, the superconducting magnet can be further reduced in size. Also in this case, the value of the critical current in joining portion 12 is equal to or greater than 6 times as high as that in the case where the temperature inside cryostat 2 is 77 kelvin. Thus, in this case, the amount of current that flows through coil 1 can be increased.

In the superconducting magnet according to the first embodiment, in the case where the temperature inside cryostat 2 is greater than 4.2 kelvin and equal to or less than 50 kelvin and a current flows through joining portion 12 in the superconducting state when a magnetic field equal to or greater than 1.0 tesla and equal to or less than 10 tesla is applied at 50 kelvin, joining portion 12 can be disposed at the position where the strength of the magnetic field generated by the current flowing through coil 1 is equal to or greater than 1.0 tesla and equal to or less than 10 tesla. Accordingly, in this case, the superconducting magnet can be further reduced in size. Also in this case, the value of the critical current in joining portion 12 does not significantly decrease as compared with the case where the temperature inside cryostat 2 is 4.2 kelvin, but significantly increases as compared with the case where the temperature inside cryostat 2 is 77 kelvin. Thus, in this case, an operation can be performed at a relatively high temperature while increasing the amount of current flowing through coil 1.

In the superconducting magnet according to the first embodiment, when joining portion 12 is disposed such that the joining interface between first portion 11*ca* and second portion 11*cb* is in parallel with the direction of the magnetic field generated by the current flowing through coil 1, the substantial critical magnetic field strength in joining portion 12 increases. Thus, in this case, joining portion 12 can be disposed at a position where the magnetic field strength is relatively high, and the superconducting magnet can be further reduced in size.

When the superconducting magnet according to the first embodiment further includes joining layer 12*a*, the reliability of joining portion 12 can be improved as compared with the case where first portion 11*ca* and second portion 11*cb* are directly joined to each other. Based on the findings newly discovered by the present inventors, joining portion 12 including joining layer 12*a* improves not only the reliability in joining portion 12 but also the critical magnetic field strength and the critical current in joining portion 12.

Second Embodiment

In the following, a superconducting magnet according to the second embodiment will be described. In the description below, differences from the superconducting magnet according to the first embodiment will be mainly described and the same explanation will not be repeated.

The superconducting magnet according to the second embodiment includes a coil 1 and a cryostat 2. Coil 1 includes a superconducting layer 11*c* and a joining portion 12. Superconducting layer 11*c* includes a first portion 11*ca* and a second portion 11*cb* in the termination portion. In joining portion 12, first portion 11*ca* and second portion 11*cb* are superconducting-joined.

A current flows through joining portion 12 in the superconducting state when a magnetic field equal to or greater than 1.0 tesla and equal to or less than 5.0 tesla is applied to joining portion 12 at 77 kelvin. It is preferable that a current flows through joining portion 12 in the superconducting state when a magnetic field equal to or greater than 1.0 tesla and equal to or less than 5.0 tesla is applied to joining portion 12 at 4.2 kelvin. Furthermore, it is preferable that a current flows through joining portion 12 in the superconducting state when a magnetic field equal to or greater than 1.0 tesla and equal to or less than 5.0 tesla is applied to joining portion 12 at 50 kelvin.

The temperature inside cryostat 2 is equal to or greater than 2.0 kelvin and equal to or less than 77 kelvin. It is preferable that the temperature inside cryostat 2 is equal to or greater than 2.0 kelvin and equal to or less than 4.2 kelvin. It is preferable that the temperature inside cryostat 2 is greater than 4.2 kelvin and equal to or less than 50 kelvin. The superconducting magnet according to the second embodiment is identical in the above-described points to the superconducting magnet according to the first embodiment.

Figure 8:
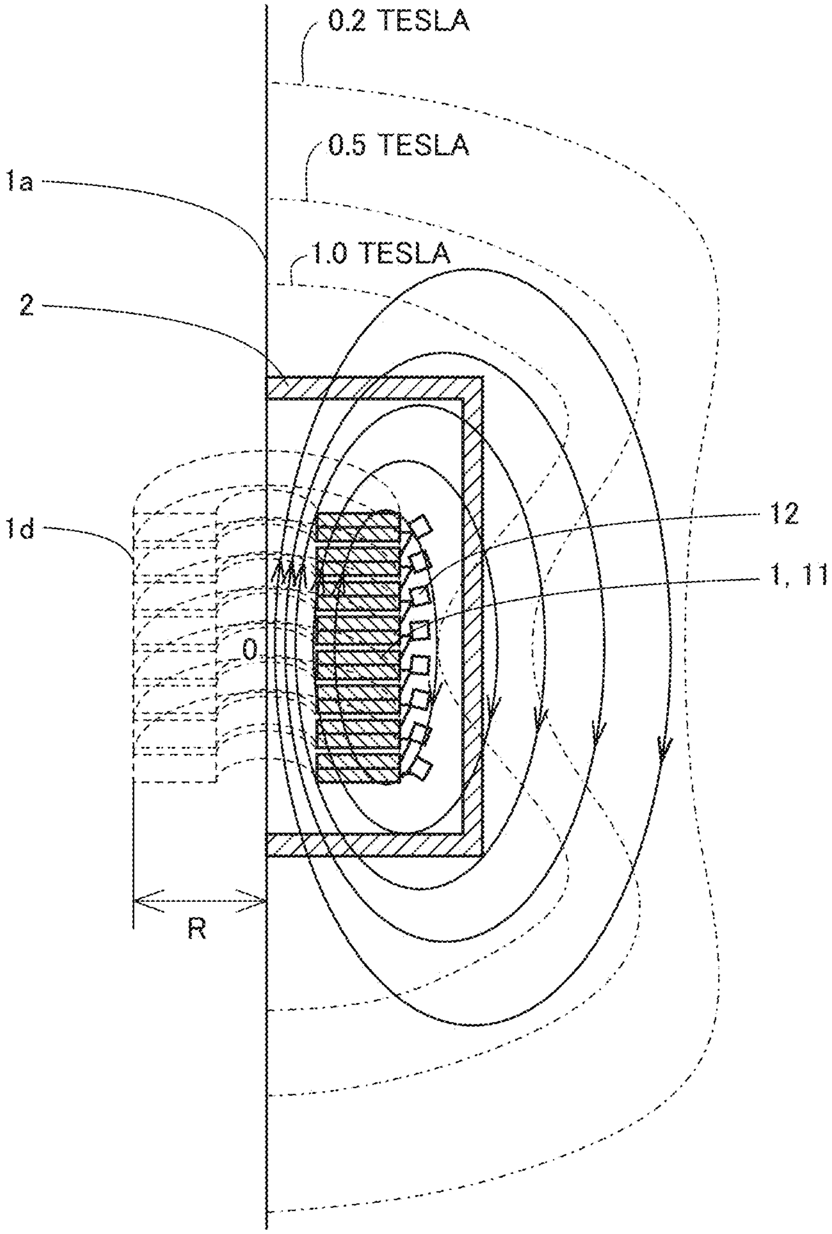
FIG. 8 is a schematic cross-sectional view of a superconducting magnet according to the second embodiment.

FIG. 8 is a schematic cross-sectional view of a superconducting magnet according to the second embodiment. In the superconducting magnet according to the second embodiment, coil 1 is a double pancake coil as shown in FIG. 8. In this point, the superconducting magnet according to the second embodiment is different from the superconducting magnet according to the first embodiment.

Coil 1 is formed by concentrically winding a superconducting wire 11 around a central axis 1*a*. Coil 1 has an outer circumferential surface 1*d* about central axis 1*a*. Superconducting wire 11 is pulled out to the outside of coil 1 on the outer circumferential surface 1*d* side. In other words, the termination portion of coil 1 is located on the outer circumferential surface 1*d* side. Coil 1 has a coil diameter R. Coil diameter R corresponds to a distance between central axis 1*a* and outer circumferential surface 1*d*.

Joining portion 12 is disposed at the position where the distance from outer circumferential surface 1*d* is equal to or greater than 0.125 times and equal to or less than 0.75 times as large as coil diameter R. Joining portion 12 may be disposed at the position where the distance from outer circumferential surface 1*d* is equal to or greater than 0.0125 times and equal to or less than 0.375 times as large as coil diameter R. In addition, when the center strength of the magnetic field generated by the current flowing through coil 1 is 21.6 tesla, the strength of the magnetic field generated by the current flowing through coil 1 is equal to or greater than 1.0 tesla and equal to or less than 10 tesla at the position where the distance from outer circumferential surface 1*d* is equal to or greater than 0.125 times and equal to or less than 0.75 times as large as coil diameter R.

In the superconducting magnet according to the second embodiment, when the temperature inside cryostat 2 is equal to or less than 77 kelvin and when a magnetic field equal to or greater than 1.0 tesla and equal to or less than 5.0 tesla is applied at 77 kelvin, a current flows through joining portion 12 in the superconducting state. As described above, at the position where the distance from outer circumferential surface 1*d* is equal to or greater than 0.125 times and equal to or less than 0.75 times as large as coil diameter R, the strength of the magnetic field by the current flowing through coil 1 is equal to or greater than 1.0 tesla and equal to or less than 10 tesla. Thus, the superconducting magnet according to the second embodiment can be operated in a permanent current mode and also can be reduced in size.

It should be understood that the embodiments disclosed herein are illustrative and non-restrictive in every respect. The scope of the present disclosure is defined by the terms of the claims, rather than the description of the embodiments provided above, and is intended to include any modifications within the meaning and scope equivalent to the terms of the claims.

REFERENCE SIGNS LIST

1 coil, 1*a* central axis, 1*b* first end, 1*c* second end, 1*d* outer circumferential surface, 2 cryostat, 11 superconducting wire, 11*a* base material, 11*b* intermediate layer, 11*c* superconducting layer, 11*ca* first portion, 11*cb* second portion, 11*d* protection layer, 11*e* stabilization layer, 12 joining portion, 12*a* joining layer, 12*b* microcrystal film, L coil length, R coil diameter, 51 first step, S2 second step.

The invention claimed is:

1. A superconducting magnet comprising:

a coil including a superconducting layer having a first portion and a second portion, and a joining portion; and a cryostat in which the coil is stored, wherein the first portion and the second portion are located in a termination portion of the coil, the superconducting layer forms a closed loop by superconducting-joining of the first portion and the second portion at the joining portion, the superconducting layer is made of a high-temperature superconductor, a current flows through the joining portion in a superconducting state when a magnetic field equal to or greater than 1.0 tesla and equal to or less than 5.0 tesla is applied to the joining portion at 77 kelvin, the cryostat is configured such that a temperature inside the cryostat is equal to or greater than 2.0 kelvin and equal to or less than 77 kelvin, the coil is a double pancake coil, the joining portion is disposed at a position where a strength of a magnetic field generated by a current flowing through the coil is equal to or greater than 1.0 tesla and equal to or less than 5.0 tesla and where a distance from an outer circumferential surface of the coil is equal to or greater than 0.125 times and equal to or less than 0.75 times as large as a coil diameter of the coil, and the joining portion is disposed proximal to the outer circumferential surface of the coil.

2. The superconducting magnet according to claim 1, wherein the high-temperature superconductor is a REBCO, and the joining portion further includes a joining layer formed of the high-temperature superconductor and disposed between the first portion and the second portion.

3. The superconducting magnet according to claim 2, wherein the joining layer is disposed such that a crystal orientation of the joining layer extends along a crystal orientation of each of the first portion and the second portion.

4. The superconducting magnet according to claim 1, further comprising a magnetic shield that is disposed inside the cryostat so as to cover the joining portion, the magnetic shield being configured to decrease a strength of a magnetic field generated by a current flowing through the coil, wherein the joining portion is disposed at a position where the strength of the magnetic field generated by the current flowing through the coil is equal to or greater than 1.0 tesla and equal to or less than 10 tesla.

5. The superconducting magnet according to claim 1, wherein a current flows through the joining portion in the superconducting state when a magnetic field equal to or greater than 1.0 tesla and equal to or less than 10 tesla is applied to the joining portion at 4.2 kelvin, the cryostat is configured such that the temperature inside the cryostat is equal to or greater than 2.0 kelvin and equal to or less than 4.2 kelvin, and the joining portion is disposed at a position where a strength of a magnetic field generated by a current flowing through the coil is equal to or greater than 1.0 tesla and equal to or less than 10 tesla.

6. The superconducting magnet according to claim 1, wherein a current flows through the joining portion in the superconducting state when a magnetic field equal to or greater than 1.0 tesla and equal to or less than 10 tesla is applied to the joining portion at 50 kelvin, the cryostat is configured such that the temperature inside the cryostat is greater than 4.2 kelvin and equal to or less than 50 kelvin, and the joining portion is disposed at a position where a strength of a magnetic field generated by a current flowing through the coil is equal to or greater than 1.0 tesla and equal to or less than 10 tesla.

7. The superconducting magnet according to claim 1, wherein a joining interface between the first portion and the second portion is disposed in parallel to a direction of a magnetic field generated by a current flowing through the coil.

8. A superconducting magnet comprising:

a coil including a superconducting layer having a first portion and a second portion, and a joining portion; and a cryostat in which the coil is stored, wherein the first portion and the second portion are located in a termination portion of the coil, the superconducting layer forms a closed loop by superconducting-joining of the first portion and the second portion at the joining portion, the superconducting layer is made of a high-temperature superconductor, a current flows through the joining portion in a superconducting state when a magnetic field equal to or greater than 1.0 tesla and equal to or less than 5.0 tesla is applied to the joining portion at 77 kelvin, and the cryostat is configured such that a temperature inside the cryostat is equal to or greater than 2.0 kelvin and equal to or less than 77 kelvin, the coil is a solenoid coil, the joining portion is disposed at a position where a distance from an end of the coil in a coil length direction is equal to or greater than 0.033 times and equal to or less than 0.23 times as large as a coil length of the coil and where a strength of a magnetic field generated by a current flowing through the coil is equal to or greater than 1.0 tesla and equal to or less than 5.0 tesla, and the joining portion is disposed proximal to the end of the coil in the coil length direction.

* * * * *